United States Patent
Kumazawa (10) Patent No.: US 11,691,615 B2
(45) Date of Patent: Jul. 4, 2023

(54) CONTROLLER FOR HYBRID ELECTRIC VEHICLE, CONTROL METHOD FOR HYBRID ELECTRIC VEHICLE, AND MEMORY MEDIUM

(71) Applicant: TOYOTA JIDOSHA KABUSHIKI KAISHA, Toyota (JP)

(72) Inventor: Suguru Kumazawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/847,710

(22) Filed: Jun. 23, 2022

(65) Prior Publication Data

US 2023/0009687 A1    Jan. 12, 2023

(30) Foreign Application Priority Data

Jul. 8, 2021    (JP) .................................. 2021-113569

(51) Int. Cl.
| | | |
|---|---|---|
| *B60W 20/10* | (2016.01) | |
| *B60W 10/06* | (2006.01) | |
| *B60W 10/08* | (2006.01) | |
| *F02D 41/00* | (2006.01) | |

(52) U.S. Cl.
CPC ............ *B60W 20/10* (2013.01); *B60W 10/06* (2013.01); *B60W 10/08* (2013.01); *F02D 41/0087* (2013.01); *B60W 2510/081* (2013.01); *B60W 2710/06* (2013.01); *B60W 2710/083* (2013.01)

(58) Field of Classification Search
CPC ...... B60W 20/10; B60W 10/06; B60W 10/08; B60W 2510/081; B60W 2710/06; B60W 2710/083; F02D 41/0087; F02D 29/02
See application file for complete search history.

(56) References Cited

U.S. PATENT DOCUMENTS

| | | | |
|---|---|---|---|
| 2015/0258976 A1* | 9/2015 | Takahashi | ........... F02D 41/0087 903/945 |
| 2017/0234253 A1* | 8/2017 | Serrano | ................. F02D 41/126 123/436 |
| 2019/0367006 A1* | 12/2019 | Furusho | .................. B60L 50/16 |
| 2020/0062235 A1* | 2/2020 | Goto | ..................... B60W 30/20 |

FOREIGN PATENT DOCUMENTS

JP            2020-150649 A        9/2020

* cited by examiner

*Primary Examiner* — George C Jin
(74) *Attorney, Agent, or Firm* — Oblon, McClelland, Maier & Neustadt, L.L.P.

(57) ABSTRACT

A torque reducing process reduces torque of a multiphase rotating electric machine when a magnitude of current in a particular phase of the rotating electric machine remains greater than or equal to a given value. A deactivating process deactivates combustion control in a deactivated cylinder and continues combustion control in the remaining cylinders. A fluctuation torque applying process cyclically fluctuates the torque of the rotating electric machine in a cycle that is an integral multiple of a compression top dead center occurrence cycle when the deactivating process is being executed. A prohibiting process prohibits execution of the deactivating process in a predetermined situation where a rotation speed of a rotary shaft of the rotating electric machine is less than or equal to a given speed.

7 Claims, 6 Drawing Sheets

CONTROLLER FOR HYBRID ELECTRIC VEHICLE, CONTROL METHOD FOR HYBRID ELECTRIC VEHICLE, AND MEMORY MEDIUM

BACKGROUND

1. Field

The present disclosure relates to a controller for a hybrid electric vehicle, a control method for a hybrid electric vehicle, and a memory medium.

2. Description of Related Art

Japanese Laid-Open Patent Publication No. 2020-150649 discloses an example of a controller for a hybrid electric vehicle that includes a multiphase rotating electric machine. When the amount of current that flows through a particular one of the phases of the multiphase rotating electric machine remains greater than the amount of current flowing through another phase, the controller reduces torque of the multiphase rotating electric machine. The controller is used to rotate driven wheels by causing the vehicle to slightly roll back and consequently rotate the multiphase rotating electric machine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: An aspect of the present disclosure provides a controller for a hybrid electric vehicle. The controller includes control circuitry configured to transmit power of an internal combustion engine and power of a multiphase rotating electric machine to a driven wheel in the hybrid electric vehicle in which the controller is employed. The control circuitry is configured to execute a torque reducing process, a deactivating process, a fluctuation torque applying process, and a prohibiting process. The torque reducing process reduces torque of the multiphase rotating electric machine when a magnitude of current in a particular phase of the multiphase rotating electric machine remains greater than or equal to a given value. The deactivating process deactivates combustion control in a deactivated cylinder that is one or more of cylinders of the internal combustion engine and continues combustion control in the remaining ones of the cylinders. The fluctuation torque applying process cyclically fluctuates the torque of the multiphase rotating electric machine in a cycle that is an integral multiple of a compression top dead center occurrence cycle when the deactivating process is being executed. The compression top dead center occurrence cycle is a cycle during which a compression top dead center occurs in the internal combustion engine. The prohibiting process prohibits execution of the deactivating process in a predetermined situation in which a rotation speed of a rotary shaft of the multiphase rotating electric machine is less than or equal to a given speed.

Even if the deactivating process is not executed, the torque of the internal combustion engine fluctuates in the cycle during which the compression top dead center occurs. Further, when the deactivating process is executed, the torque of the internal combustion engine fluctuates in the cycle during which the compression top dead center of the deactivated cylinder occurs. Thus, regardless of whether the deactivating process has been executed, the fluctuation of the torque of the internal combustion engine tends to be an integral multiple of the compression top dead center occurrence cycle. In particular, the torque fluctuation of the internal combustion engine becomes larger when the deactivating process is executed than when the deactivating process is not executed. To solve this problem, the above-described configuration executes the fluctuation torque applying process to cyclically fluctuate the torque of the rotating electric machine in a cycle that is an integral multiple of the compression top dead center occurrence cycle. This prevents the vibration that results from the deactivating process.

In the predetermined situation in which the rotation speed of the rotary shaft of the multiphase rotating electric machine is less than or equal to the given speed, the torque reducing process may be executed. When the torque reducing process is executed and the fluctuation torque applying process is executed, the fluctuation torque applying process may interfere with the torque reducing process. To solve this problem, the above-described configuration prohibits the deactivating process in the predetermined situation. This prevents situations in which the fluctuation torque applying process is executed when the torque reducing process is executed.

The inventors examined executing a regenerating process for an exhaust gas aftertreatment device when the shaft torque of the internal combustion engine is not zero. More specifically, the inventors examined, as the regenerating process, supplying unburned fuel and oxygen into exhaust gas by deactivating combustion control only in the deactivated cylinder (one or more cylinders) of the internal combustion engine and increasing the air-fuel ratio of the remaining cylinders to be richer than the stoichiometric air-fuel ratio. Further, the inventors examined pulsating the torque of the multiphase rotating electric machine in order to prevent the vibration that results from the torque fluctuation of the internal combustion engine during the regenerating process. However, in this case, if the process that pulsates the torque interferes with the process that reduces the torque, the control performance may decrease. The above-described configuration reduces such a risk.

Aspect 2: In the controller for the hybrid electric vehicle according to Aspect 1, the control circuitry is further configured to execute a determining process that determines whether an execution condition of the torque reducing process is satisfied. The prohibiting process includes a process that prohibits execution of the deactivating process by determining that the predetermined situation is a case where the determining process determines that the execution condition is satisfied.

In the above-described configuration, the deactivating process is prohibited by determining that the predetermined situation is the case where the determining process determines that the execution condition is satisfied. This prevents, for example, situations in which the deactivating process is prohibited although the torque reducing process is not executed in reality.

Aspect 3: In the controller for the hybrid electric vehicle according to Aspect 1, the prohibiting process includes a process that prohibits execution of the deactivating process by determining that the predetermined situation is a case where a vehicle speed is less than or equal to a threshold value.

When the torque of the rotating electric machine is almost balanced with an external force or the like applied to the driven wheel so that the hybrid electric vehicle enters a stopped state or an almost stopped state, the torque reducing process is executed. Thus, in the above-described configuration, the deactivating process is prohibited by determining that the predetermined situation is the case where the vehicle speed is less than or equal to the threshold value. This prevents, for example, situations in which the deactivating process is executed when the torque reducing process is executed. Consequently, situations are prevented in which the fluctuation torque applying process is executed when the torque reducing process is executed.

Aspect 4: In the controller for the hybrid electric vehicle according to Aspect 1, the prohibiting process includes a process that prohibits execution of the deactivating process by determining that the predetermined situation is a case where the rotation speed of the rotary shaft of the multiphase rotating electric machine is less than or equal to a predetermined value.

When the torque of the multiphase rotating electric machine is almost balanced with an external force or the like applied to the driven wheel so that the hybrid electric vehicle enters an almost still state, the torque reducing process is executed. Thus, in the above-described configuration, the deactivating process is prohibited by determining that the predetermined situation is the case where the rotation speed of the multiphase rotating electric machine is less than or equal to the predetermined value. This prevents situations in which the deactivating process is executed when the torque reducing process is executed. Consequently, situations are prevented in which the fluctuation torque applying process is executed when the torque reducing process is executed.

Aspect 5: In the controller for the hybrid electric vehicle according to any one of Aspects 1 to 4, the prohibiting process includes a process that suspends the deactivating process when the predetermined situation occurs when the deactivating process is being executed.

In the above-described configuration, in a case where a situation different from the predetermined situation changes to the predetermined situation during the execution of the deactivating process, the deactivating process is suspended. This prevents situations in which the fluctuation torque applying process is executed when the torque reducing process is executed.

Aspect 6: A control method for a hybrid electric vehicle may be provided to execute the various processes according to any one of the above-described aspects 1 to 5.

Aspect 7: A non-transitory computer-readable memory medium may be provided to store a program that causes a processor to execute the various processes according to any one of the above-described aspects 1 to 5.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A first embodiment will now be described with reference to FIGS. 1 to 4.

Figure 1:
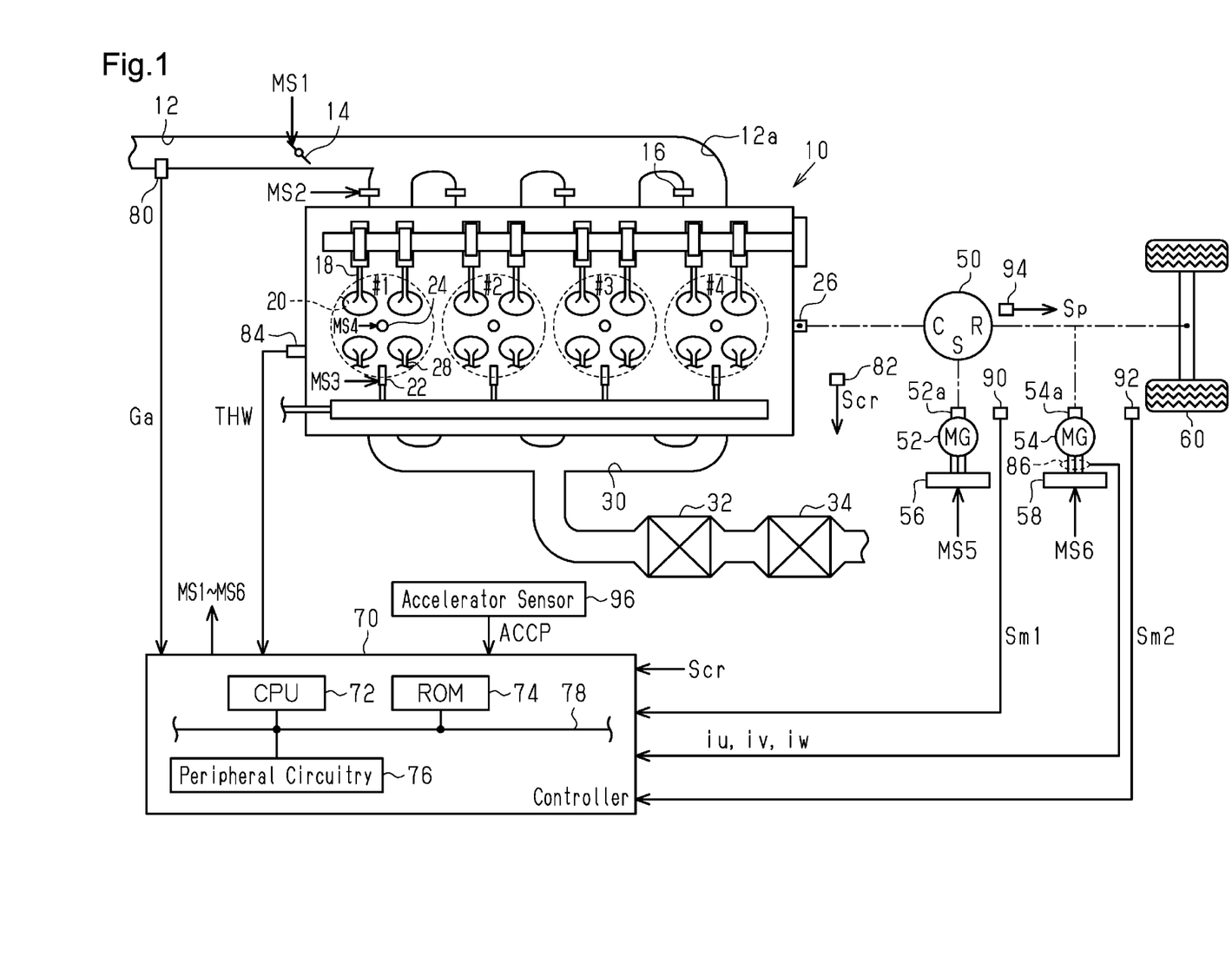
FIG. 1 is a diagram showing the configuration of a vehicle according to an embodiment.

As shown in FIG. 1, an internal combustion engine 10 includes four cylinders #1 to #4. The internal combustion engine 10 includes an intake passage 12 provided with a throttle valve 14. An intake port 12a at a downstream portion of the intake passage 12 includes port injection valves 16. Each of the port injection valves 16 injects fuel into the intake port 12a. The air drawn into the intake passage 12 and the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32 having an oxygen storage capacity and a gasoline particulate filter (GPF) 34. In the GPF 34 of the present embodiment, a three-way catalyst is supported by a PM-trapping filter.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. A first inverter 56 applies alternating-current voltage to a terminal of the first motor generator 52. A second inverter 58 applies alternating-current voltage to a terminal of the second motor generator 54.

A controller 70 includes control circuitry that controls the internal combustion engine 10. In order to control the controlled variables of the internal combustion engine 10 (e.g., torque or exhaust component ratio), the controller 70 operates operation units of the internal combustion engine 10 such as the throttle valve 14, the port injection valves 16, the direct injection valves 22, and the ignition plugs 24. The controller 70 also controls the first motor generator 52, and operates the first inverter 56 in order to control torque (controlled variable) of the first motor generator 52. The controller 70 further controls the second motor generator 54, and operates the second inverter 58 in order to control torque (controlled variable) of the second motor generator 54. FIG. 1 shows operation signals MS1 to MS6 that correspond to the throttle valve 14, the port injection valves 16, the direct injection valves 22, the ignition plugs 24, the first inverter 56, and the second inverter 58, respectively. To control the controlled variables, the controller 70 refers to an intake air amount Ga detected by an air flow meter 80 and an output signal Scr of a crank angle sensor 82. Further, the controller 70 refers to a water temperature THW detected by a water temperature sensor 84 and currents iu, iv, iw detected by a current sensor 86. The currents iu, iv, iw are output line currents of the second inverter 58. In order to control the controlled variables of the first motor generator 52, the controller 70 refers to an output signal Sm1 of a first rotation angle sensor 90 that detects the rotation angle of the first motor generator 52. In order to control the controlled variables of the second motor generator 54, the controller 70 refers to an output signal Sm2 of a second rotation angle sensor 92 that detects the rotation angle of the second motor generator 54. The controller 70 refers to an output signal Sp of an output-side rotation angle sensor 94 that detects the rotation angle of the ring gear R. The controller 70 refers to an accelerator operation amount ACCP that is the depression amount of the accelerator pedal detected by an accelerator sensor 96.

The control circuitry of the controller 70 includes a CPU 72, a ROM 74, and peripheral circuitry 76. These components are capable of communicating with one another via a communication line 78. The peripheral circuitry 76 includes a circuit that generates, for example, a clock signal regulating internal operations, a power supply circuit, and a reset circuit. The controller 70 controls the controlled variables by causing the CPU 72 to execute programs stored in the ROM 74.

The processes executed by the controller 70 include a regenerating process for the GPF 34, a vibration limiting process that follows the regenerating process, and a process that protects the second motor generator 54. These processes will now be described in this order.

Regenerating Process for GPF 34

Figure 2:
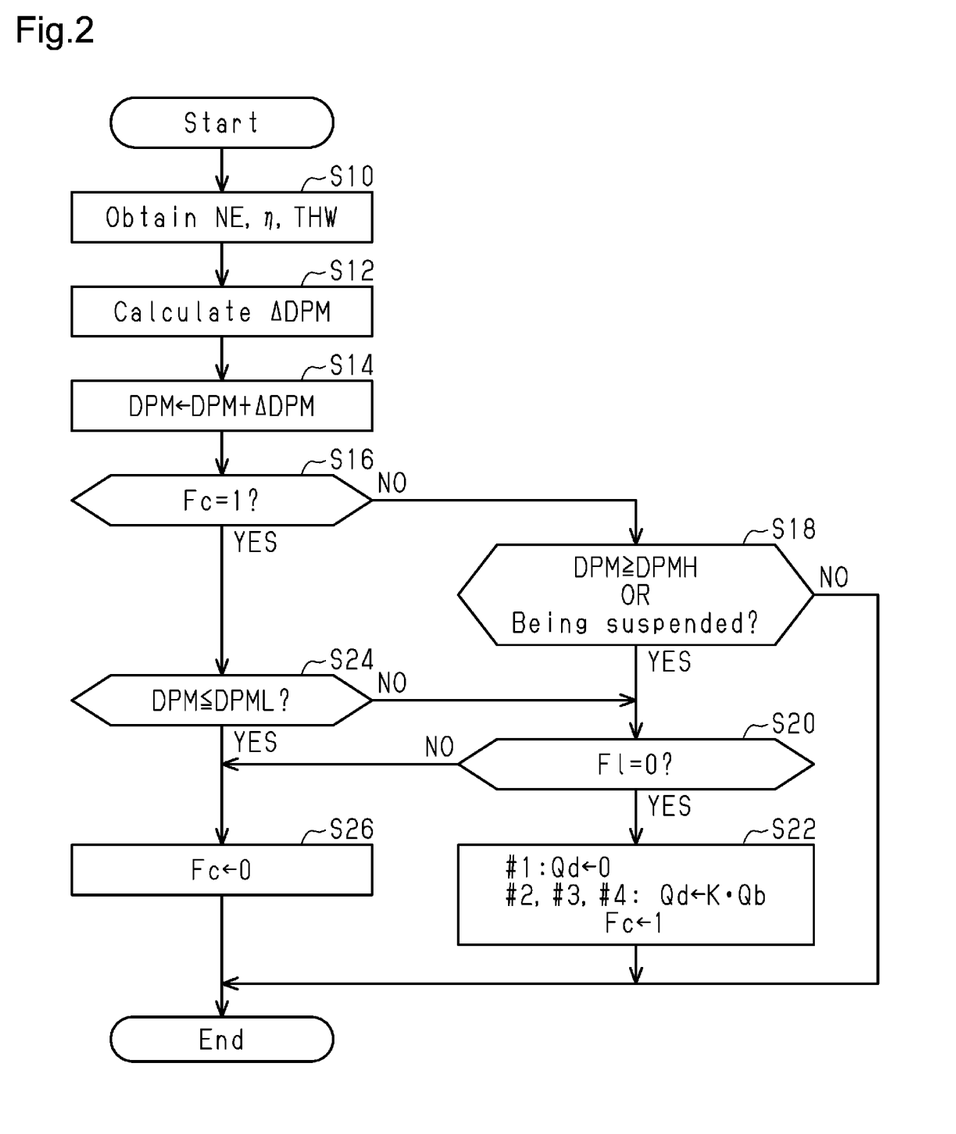
FIG. 2 is a flowchart illustrating a procedure of processes executed by the controller in FIG. 1.

FIG. 2 shows a procedure of the regenerating process for the GPF 34. The processes shown in FIG. 2 are executed by the CPU 72 repeatedly executing programs stored in the ROM 74, for example, in a predetermined cycle. In the following description, the number of each step is represented by the letter S followed by a numeral.

In the series of processes shown in FIG. 2, the CPU 72 first obtains the engine rotation speed NE, the charging efficiency η, and the water temperature THW (S10). The engine rotation speed NE is the rotation speed of the crankshaft 26. The rotation speed NE is calculated by the CPU 72 in reference to the output signal Scr. The charging efficiency η is calculated by the CPU 72 in reference to the rotation speed NE and the intake air amount Ga.

Next, the CPU 72 uses the engine rotation speed NE, the charging efficiency η, and the water temperature THW to calculate an update amount ΔDPM of a deposition amount DPM (S12). The deposition amount DPM is the amount of PM trapped by the GPF 34. More specifically, the CPU 72 uses the engine rotation speed NE, the charging efficiency η, and the water temperature THW to calculate the amount of PM in the exhaust gas discharged to the exhaust passage 30. Further, the CPU 72 uses the engine rotation speed NE and the charging efficiency η to calculate the temperature of the GPF 34. The CPU 72 uses the amount of PM in exhaust gas and the temperature of the GPF 34 to calculate the update amount ΔDPM. When executing the process of S22 (described later), the CPU 72 simply needs to use an increase coefficient K to calculate the temperature of the GPF 34 and the update amount ΔDPM.

Then, the CPU 72 updates the deposition amount DPM in correspondence with the deposition amount DPM (S14). Subsequently, the CPU 72 determines whether an execution flag Fc is 1 (S16). When the execution flag Fc is 1, the execution flag Fc indicates that a temperature-increasing process is being executed to burn and remove the PM in the GPF 34. When the execution flag Fc is 0, the execution flag Fc indicates that the temperature-increasing process is not being executed. When determining that the execution flag Fc is 0 (S16: NO), the CPU 72 determines whether the logical disjunction is true of a condition in which the deposition amount DPM is greater than or equal to a regeneration execution value DPMH and a condition in which the process of S22 (described later) is suspended in the current period (S18). The regeneration execution value DPMH is set to a value in which PM needs to be removed because the amount of PM trapped by the GPF 34 is large.

When determining that the logical disjunction is true of the condition in which the deposition amount DPM is greater than or equal to the regeneration execution value DPMH and the condition in which the process of S22 is suspended in the current period (S18: YES), the CPU 72 determines that the request of executing the GPF 34 has been issued and determines whether a reduction flag F1 (described later) is 0 (S20). The letter l of the reduction flag F1 is a lowercase letter l. When determining that the reduction flag F1 is 0 (S20: YES), the CPU 72 executes the temperature-increasing process and substitutes 1 into the execution flag Fc (S22). In the temperature-increasing process of the present embodiment, the CPU 72 deactivates the injection of fuel from the port injection valve 16 and the direct injection valve 22 of cylinder #1 and makes the air-fuel ratio of the air-fuel mixture in the combustion chambers 20 of cylinders #2, #3, #4 richer than the stoichiometric air-fuel ratio. The first reason for executing the temperature-increasing process of S22 is to increase the temperature of the three-way catalyst 32. That is, the temperature-increasing process of S22 causes oxygen and unburned fuel to be discharged to the exhaust passage 30 so as to oxidize the unburned fuel in the three-way catalyst 32 and thus increase the temperature of the three-way catalyst 32. The second reason for executing the temperature-increasing process of S22 is to increase the temperature of the GPF 34 so as to supply the heated GPF 34 with oxygen, thereby oxidizing and removing the PM trapped by the GPF 34. That is, in the temperature-increasing process of S22, when the temperature of the three-way catalyst 32 increases, the temperature of the GPF 34 is increased by the flow of high-temperature exhaust gas into the GPF 34. When oxygen flows into the heated GPF 34, the PM trapped by the GPF 34 is oxidized and thus removed.

More specifically, the CPU 72 substitutes 0 into a requested injection amounts Qd for each of the port injection valve 16 and the direct injection valve 22 of cylinder #1. Further, the CPU 72 substitutes, into the requested injection amount Qd of each of cylinders #2, #3, #4, the value obtained by multiplying the increase coefficient K by the base injection amount Qb. In the present embodiment, S22 corresponds to a deactivating process. Cylinder #1 corresponds to a deactivated cylinder that is one or more of cylinders #1 to #4 of the internal combustion engine 10. Cylinders #2, #3, #4 correspond to the remaining cylinders #2, #3, #4. In the present embodiment, the deactivating process is to deactivate combustion control in deactivated cylinder #1 and continue combustion control in the remaining cylinders #2, #3, #4.

The CPU 72 sets the increase coefficient K such that the unburned fuel in the exhaust passage discharged from cylinders #2, #3, #4 to the exhaust passage 30 becomes less than or equal to an amount that reacts with the oxygen discharged from cylinder #1 without excess or deficiency. More specifically, at the beginning of the regenerating process for the GPF 34, the CPU 72 sets the air-fuel ratio of the air-fuel mixture in cylinders #2, #3, #4 to be maximally close to the amount that reacts with the oxygen discharged from cylinder #1 without excess or deficiency so as to quickly increase the temperature of the three-way catalyst 32.

When determining that the execution flag Fc is 1 (S16: YES), the CPU 72 determines whether the deposition amount DPM is less than or equal to a deactivation lower limit guard value DPML (S24). The deactivation lower limit guard value DPML is set to a value in which the regenerating process is allowed to be deactivated because the amount of PM trapped by the GPF 34 is sufficiently small. When determining that the deposition amount DPM is greater than the deactivation lower limit guard value DPML (S24: NO), the CPU 72 proceeds to the process of S20.

When determining that the deposition amount DPM is less than or equal to the deactivation lower limit guard value DPML (S24: YES) or making a negative determination in the process of S20, the CPU 72 deactivates or suspends the process of S22 to substitute 0 into the execution flag Fc (S26). When making an affirmative determination the process of S24, the CPU 72 determines that the process of S22 is completed and then deactivates the process of S22 in S26. When making a negative determination the process of S20, the CPU 72 determines that the process of S22 is not completed and then suspends the process of S22 in S26.

When completing the process of S22 or S26 or when making a negative determination in the process of S18, the CPU 72 temporarily ends the series of processes shown in FIG. 2.

Vibration Limiting Process that Follows Regenerating Process

Figure 3:
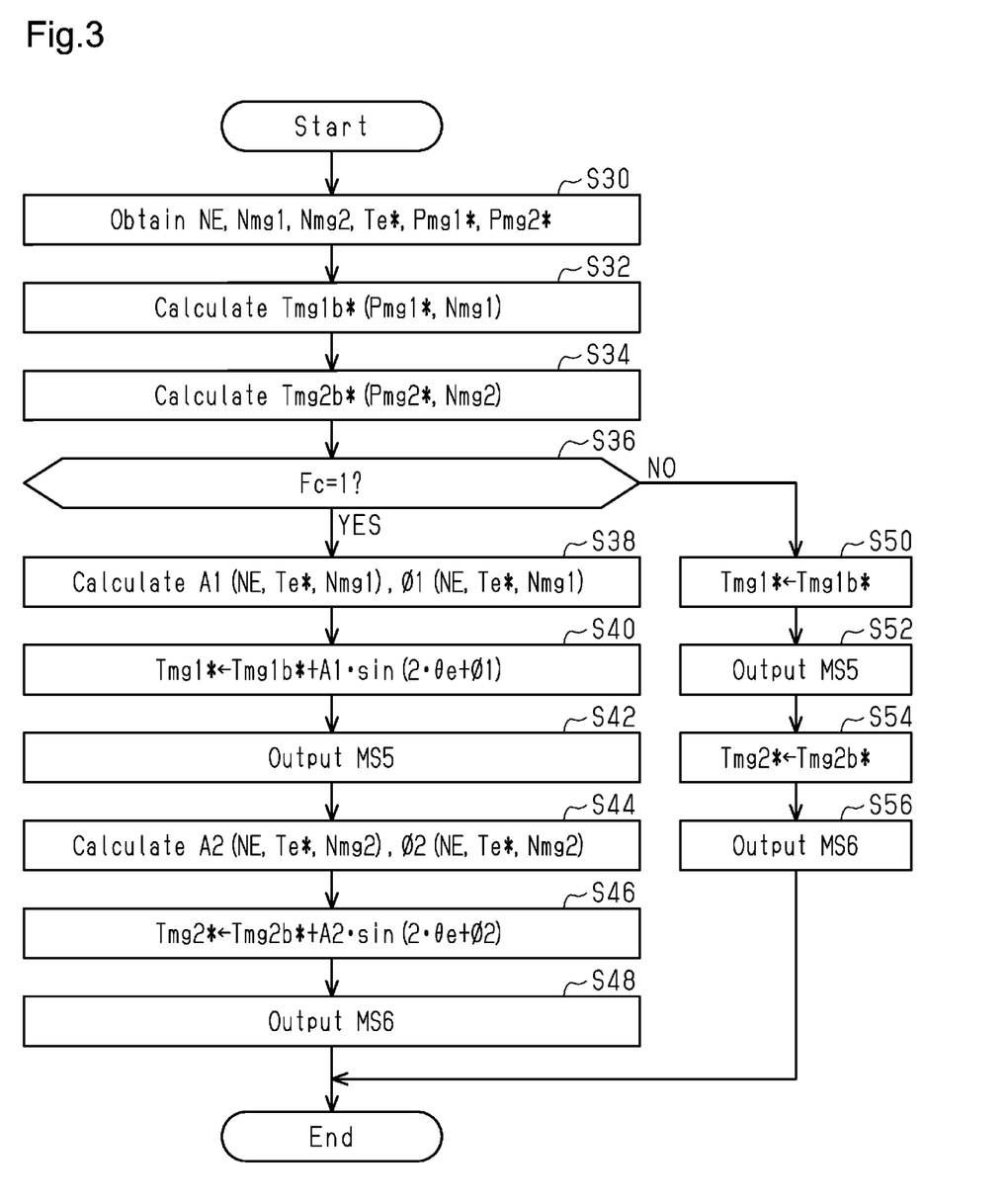
FIG. 3 is a flowchart illustrating a procedure of processes executed by the controller in FIG. 1.

FIG. 3 shows a procedure of the vibration limiting process that follows the regenerating process. The processes shown in FIG. 3 are executed by the CPU 72 repeatedly executing programs stored in the ROM 74, for example, in a predetermined cycle.

In the series of processes shown in FIG. 3, the CPU 72 first obtains the engine rotation speed NE, a first rotation speed Nmg1, a second rotation speed Nmg2, the engine requested output Te*, the first requested output Pmg1*, and the second requested output Pmg2* (S30). The first rotation speed Nmg1 is the rotation speed of the rotary shaft 52a of the first motor generator 52. The first rotation speed Nmg1 is calculated by the CPU 72 in reference to the output signal Sm1. The second rotation speed Nmg2 is the rotation speed of the rotary shaft 54a of the second motor generator 54. The second rotation speed Nmg2 is calculated by the CPU 72 in reference to the output signal Sm2. The engine requested output Te* is a requested torque for the internal combustion engine 10. The first requested output Pmg1* is a requested output for the first motor generator 52. The second requested output Pmg2* is a requested output for the second motor generator 54. The requested torque and the requested outputs are calculated by the CPU 72. The CPU 72 sets the requested output Pd* to the sum of the first requested output Pmg1*, the second requested output Pmg2*, and an engine requested output Pe* that is the product of the engine rotation speed NE and the engine requested output Te*. The requested output Pd* is obtained by adding the product of a requested driving torque Trq* and an output-side rotation speed Np to a requested power generation amount Pg* for the first motor generator 52. The requested driving torque Trq* is required by the driven wheels 60 and calculated by the CPU 72 in reference to the accelerator operation amount ACCP. The output-side rotation speed Np is the rotation speed of the ring gear R calculated by the CPU 72 in reference to the output signal Scr.

Next, the CPU 72 substitutes, into a first requested torque base value Tmg1b*, the value obtained by dividing the first rotation speed Nmg1 by the first requested output Pmg1* (S32). Further, the CPU 72 substitutes, into a second requested torque base value Tmg2b*, the value obtained by dividing the second rotation speed Nmg2 by the second requested output Pmg2* (S34).

Subsequently, the CPU 72 determines whether the execution flag Fc is 1 (S36). When determining that the execution flag Fc is 1 (S36: YES), the CPU 72 calculates a first amplitude A1 and a first phase φ1 using the engine rotation speed NE, the engine requested output Te*, and the first rotation speed Nmg1 as inputs. These variables (first amplitude A1 and first phase φ1) determine a first superimposition torque ΔTmg1* that is superimposed on the first requested torque base value Tmg1b*. The first superimposition torque ΔTmg1* is the torque of a sine wave having the first amplitude A1. The phase of the sine wave is the first phase φ1. The first superimposition torque ΔTmg1* is obtained as follows.

$$\Delta Tmg1^* = A1 \cdot \sin(2 \cdot \theta e + \varphi 1)$$

In this equation, the crank angle θe is used. The crank angle θe is calculated by the CPU 72 in reference to the output signal Scr. In this equation, the first superimposition torque ΔTmg1* has a cycle of 180° C.A. In other words, the first superimposition torque ΔTmg1* has a cycle that is one times the compression top dead center occurrence cycle. The compression top dead center occurrence cycle is a cycle during which a compression top dead center occurs in the internal combustion engine 10. In the present embodiment, the compression top dead center occurrence cycle is 180° C.A.

The CPU 72 substitutes, into the first requested torque Tmg1*, the value obtained by adding the first superimposition torque ΔTmg1* to the first requested torque base value Tmg1b* (S40). Then, the CPU 72 outputs the operation signal MS5 to the first inverter 56 in order to control the torque of the first motor generator 52 to the first requested torque Tmg1* (S42).

Further, the CPU 72 uses the engine rotation speed NE, the engine requested output Te*, and the second rotation speed Nmg2 as inputs to calculate the second amplitude A2 and the second phase φ2 (S44). These variables (second amplitude A2 and second phase φ2) determine a second superimposition torque ΔTmg2* that is superimposed on the second requested torque base value Tmg2b*. The second superimposition torque ΔTmg2* is the torque of a sine wave having the second amplitude A2. The phase of the sine wave is the second phase φ2. The second superimposition torque ΔTmg2* is obtained as follows.

$$\Delta Tmg2^* = A2 \cdot \sin(2 \cdot \theta e + \varphi 2)$$

In this equation, the second superimposition torque ΔTmg2* has a cycle of 180° C.A. In other words, the second superimposition torque ΔTmg2* has the same cycle as the compression top dead center occurrence cycle of the internal combustion engine 10.

The CPU 72 substitutes, into the second requested torque Tmg2*, the value obtained by adding the second superimposition torque ΔTmg2* to the second requested torque base value Tmg2b* (S46). Then, the CPU 72 outputs the operation signal MS6 to the second inverter 58 in order to control the torque of the second motor generator 54 to the second requested torque Tmg2* (S48).

When determining that the execution flag Fc is 0 (S36: NO), the CPU 72 substitutes the first requested torque base value Tmg1b* into the first requested torque Tmg1* (S50). Then, the CPU 72 outputs the operation signal MS5 to the first inverter 56 in order to control the torque of the first motor generator 52 to the first requested torque Tmg1* (S52). Further, the CPU 72 substitutes the second requested torque base value Tmg2b* into the second requested torque Tmg2* (S54). Then, the CPU 72 outputs the operation signal MS6 to the second inverter 58 in order to control the torque of the second motor generator 54 to the second requested torque Tmg2* (S56).

Figure 4:
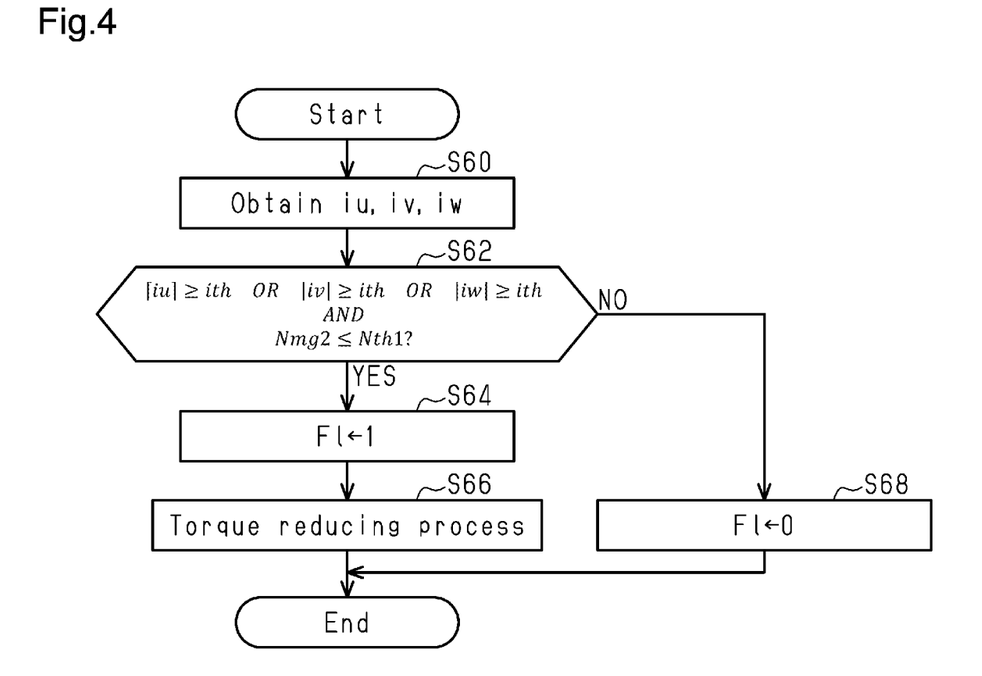
FIG. 4 is a flowchart illustrating a procedure of processes executed by the controller in FIG. 1.

When completing the process of step S48 or S56, the CPU 72 temporarily ends the series of processes shown in FIG. 4.

Process that Protects Second Motor Generator 54

FIG. 4 shows the process that protects the second motor generator 54. The processes shown in FIG. 4 are executed by the CPU 72 repeatedly executing programs stored in the ROM 74, for example, in a predetermined cycle.

In the series of processes shown in FIG. 4, the CPU 72 first obtains the currents iu, iv, iw, which are the output line currents of the second inverter 58 (S60). Then, the CPU 72 determines whether the logical conjunction of the following conditions (A) and (B) is true (S62).

Condition (A): The logical disjunction is true of a condition in which the absolute value of the current iu is greater than or equal to a given value ith, a condition in which the absolute value of the current iv is greater than or equal to the given value ith, and a condition in which the absolute value of the current iw is greater than or equal to the given value ith.

Condition (B): The second rotation speed Nmg2, which is the rotation speed of the rotary shaft 54a of the second motor generator 54, is less than or equal to a predetermined value Nth1.

In condition (B), the rotation speed of the rotary shaft 54a of the second motor generator 54 is small. Thus, condition (B) can identify a situation in which temporal changes have occurred very slowly in the U-, V-, and W-phase currents. Further, condition (A) can identify a state in which the absolute value of the current of one of the phases of the second motor generator 54 is greater than or equal to the given value ith. Accordingly, conditions (A) and (B) can identify that the absolute value of the current of one of the phases of the second motor generator 54 remains greater than or equal to the given value ith.

When determining that the logical conjunction of the following conditions (A) and (B) is true (S62: YES), the CPU 72 substitutes 1 into the reduction flag F1 (S64). When the reduction flag F1 is 1, the reduction flag F1 indicates that a torque reducing process (described later) is being executed. When the reduction flag F1 is 0, the reduction flag F1 indicates that the torque reducing process is not being executed. That is, the condition in which the logical conjunction of conditions (A) and (B) is true is the execution condition of the torque reducing process.

Then, the CPU 72 executes the torque reducing process (S66). That is, the CPU 72 corrects the second requested torque Tmg2* set in the process of S54 so as to reduce the second requested torque Tmg2*. In this case, the process of S56 outputs the operation signal MS6 in order to control the torque of the second motor generator 54 to the reduced value.

When making a negative determination in S62, the CPU 72 substitutes 0 into the reduction flag F1 (S68).

When completing the process of steps S66, S68, the CPU 72 temporarily ends the series of processes shown in FIG. 4.

The operation and advantages of the present embodiment will now be described.

For example, when the requested driving torque Trq* corresponding to the accelerator operation amount ACCP is balanced with a force acting against the traveling of the vehicle in an uphill road, the magnitude of current of a particular phase of the second motor generator 54 remains large. The CPU 72 monitors the state in which the magnitude of current of a particular phase of the second motor generator 54 is large. When determining that the magnitude of current of a particular phase of the second motor generator 54 remains large, the CPU 72 forcibly corrects the second requested torque Tmg2* so as to reduce the second requested torque Tmg2*. This causes the torque applied to the driven wheels 60 to be smaller than the requested driving torque Trq* that corresponds to the accelerator operation amount ACCP. Thus, the driven wheels 60 are slightly reversed. As a result, the rotary shaft 54a of the second motor generator 54 rotates. Since the phases of the currents iu, iv, iw change, the state in which the magnitude of current of a particular phase of the second motor generator 54 is large is cancelled. Subsequently, the CPU 72 returns the second requested torque Tmg2* to a value that is used to obtain the requested driving torque Trq*.

When the amount of PM trapped by the GPF 34 becomes large (S24: NO), the CPU 72 executes the regenerating process (S22, S36). Further, the CPU 72 superimposes the second superimposition torque ΔTmg2* on the second requested torque base value Tmg2b* (S44 to S48) in order to limit vibration of the vehicle that results from an increase in torque fluctuation of the internal combustion engine 10 caused by the regenerating process.

When executing the torque reducing process, the CPU 72 prohibits the regenerating process for the GPF 34. That is, even if the deposition amount DPM becomes greater than or equal to the regeneration execution value DPMH (S24: NO) during the execution of the torque reducing process (S20: NO), the CPU 72 prohibits the execution of the regenerating process (S26). In the case of executing the torque reducing process (S20: NO) while executing the regenerating process (S16: YES), the CPU 72 suspends the regenerating process (S26). This prevents the second motor generator 54 from outputting the second superimposition torque ΔTmg2* during the execution of the torque reducing process. This limits a decrease in the performance of controlling the torque reducing process.

Second Embodiment

A second embodiment will now be described with reference to the drawings. The differences from the first embodiment will mainly be described.

The present embodiment is different from the first embodiment in the condition for executing the regenerating process for the GPF 34.

Figure 5:
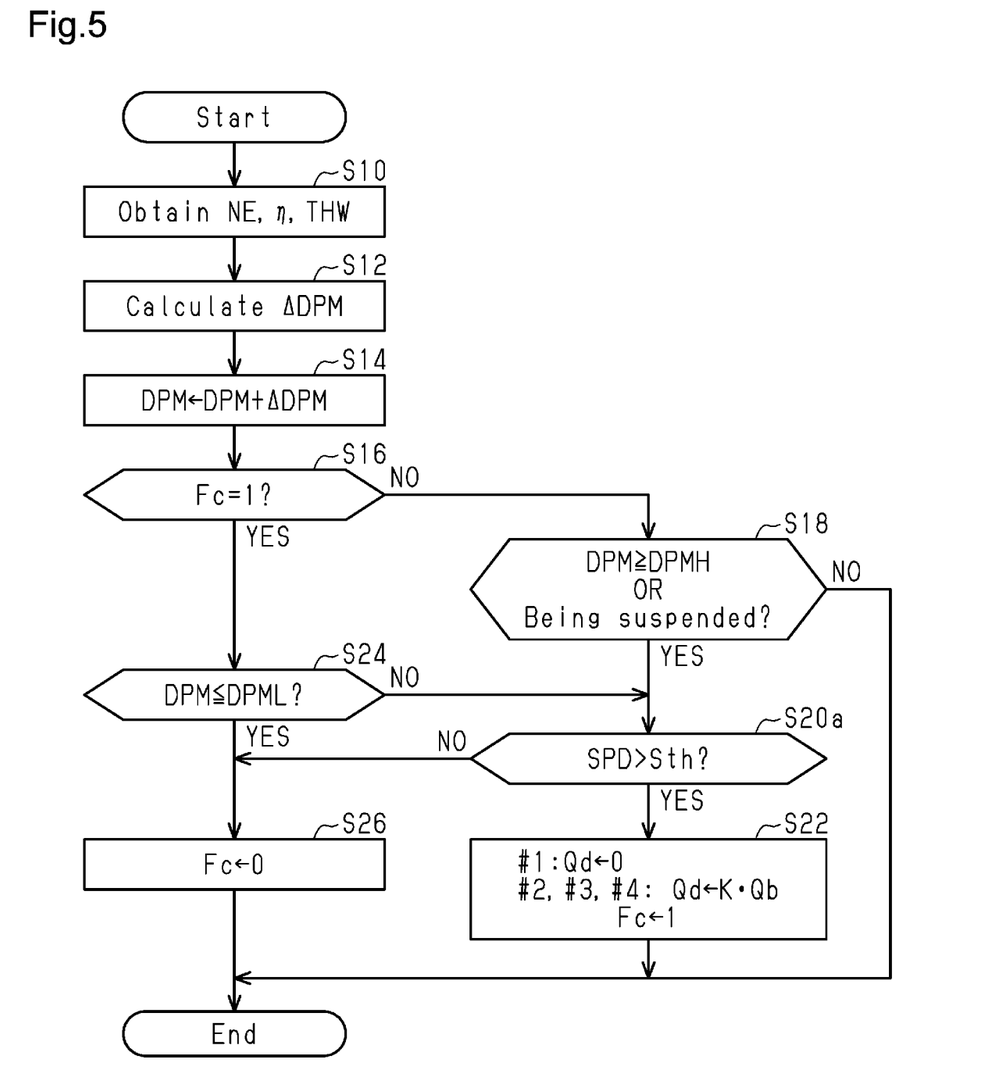
FIG. 5 is a flowchart showing a procedure of processes executed by the controller according to another embodiment.

FIG. 5 shows a procedure of the regenerating process. The processes shown in FIG. 5 are executed by the CPU 72 repeatedly executing programs stored in the ROM 74, for example, in a predetermined cycle. In FIG. 5, the same step numbers are given to the processes that correspond to those in FIG. 2.

In the series of processes shown in FIG. 5, when making an affirmative determination in the step of S18, the CPU 72 determines whether a vehicle speed SPD is greater than a threshold value Sth (S20a). When determining that the vehicle speed SPD is greater than the threshold value Sth (S20a: YES), the CPU 72 proceeds to the process of S22. When determining that the vehicle speed SPD is less than or equal to the threshold value Sth (S20a: NO), the CPU 72 proceeds to the process of S26 in order to prohibit the regenerating process. The vehicle speed SPD is calculated using, for example, the output-side rotation speed Np. Instead, the vehicle speed SPD may be calculated using a detection value of a wheel speed sensor instead of the output-side rotation speed Np.

As described above, the condition for executing the regenerating process for the GPF 34 in the present embodiment is that the vehicle speed SPD is greater than the threshold value Sth. When the vehicle speed SP is low, the second rotation speed Nmg2 of the second rotation speed Nmg2 is low and thus changes in the phases of the currents iu, iv, iw of the second motor generator 54 are small. Accordingly, the magnitude of one of the currents iu, iv, iw potentially remains greater than or equal to the given value ith. In the present embodiment, when the vehicle speed SPD is less than or equal to the threshold value Sth, the regenerating process for the GPF 34 is prohibited.

Third Embodiment

A third embodiment will now be described with reference to the drawings. The differences from the first embodiment will mainly be described.

The present embodiment is different from the first embodiment in the condition for executing the regenerating process for the GPF 34.

Figure 6:
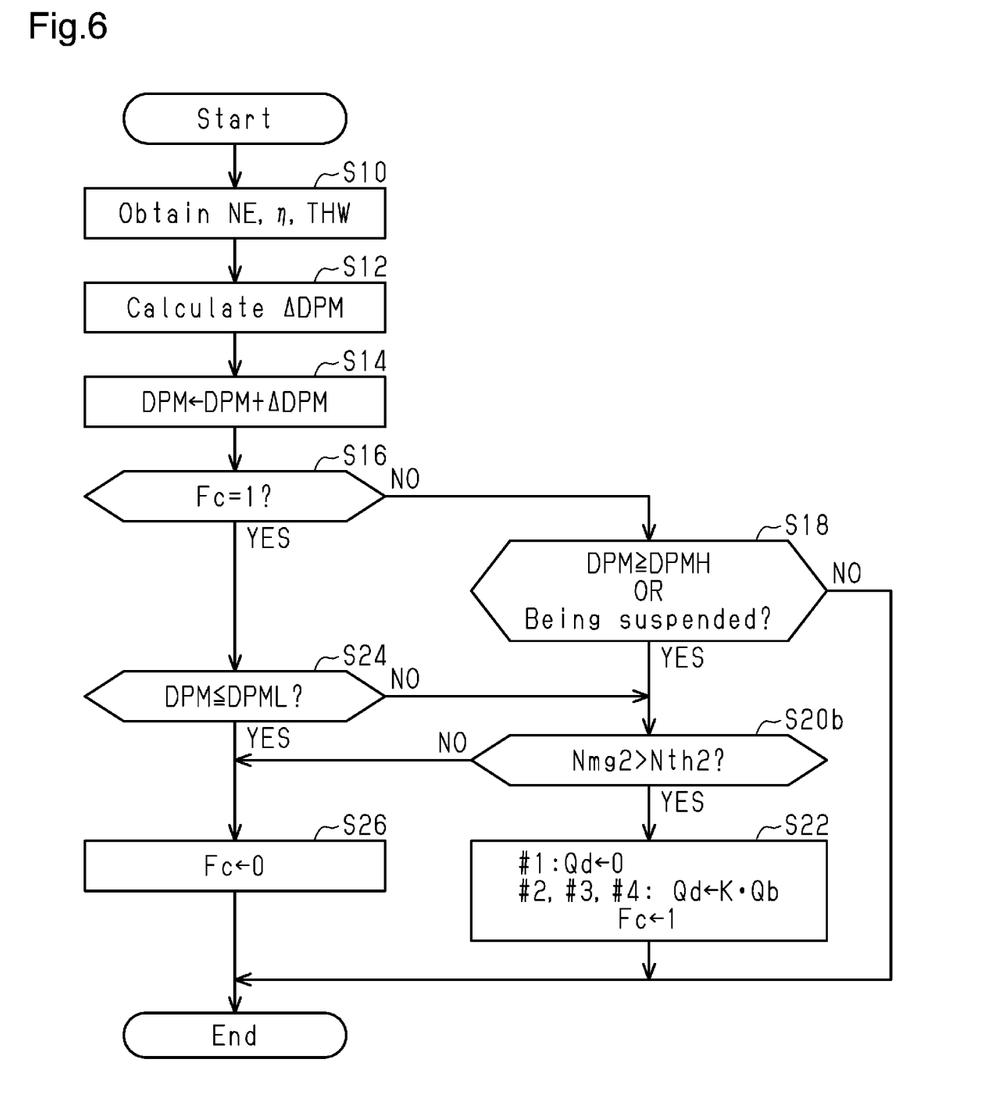
FIG. 6 is a flowchart showing a procedure of processes executed by the controller according to a further embodiment.

FIG. 6 shows a procedure of the regenerating process. The processes shown in FIG. 6 are executed by the CPU 72 repeatedly executing programs stored in the ROM 74, for example, in a predetermined cycle. In FIG. 6, the same step numbers are given to the processes that correspond to those in FIG. 2.

In the series of processes shown in FIG. 6, when making an affirmative determination in the step of S18, the CPU 72 determines whether the second rotation speed Nmg2 of the second motor generator 54 is greater than a predetermined value Nth2 (S20b). When determining that the second rotation speed Nmg2 is greater than the predetermined value Nth2 (S20b: YES), the CPU 72 proceeds to the process of S22. When determining that the second rotation speed Nmg2 is less than or equal to the predetermined value Nth2 (S20b: NO), the CPU 72 proceeds to the process of S26 in order to prohibit the regenerating process for the GPF 34.

As described above, the condition for executing the regenerating process for the GPF 34 in the present embodiment is that the second rotation speed Nmg2 of the second motor generator 54 is greater than the predetermined value Nth2. When the second rotation speed Nmg2 of the second motor generator 54 is low, changes in the phases of the currents iu, iv, iw of the second motor generator 54 are small. Accordingly, the magnitude of one of the currents iu, iv, iw potentially remains greater than or equal to the given value ith. In the present embodiment, when the second rotation speed Nmg2 is less than or equal to the predetermined value Nth2, the regenerating process is prohibited.

Correspondence

The correspondence between the items in the above-described embodiments and the items described in the above-described SUMMARY is as follows. In the following description, the correspondence is shown for each of the numbers in the examples described in the SUMMARY.

[1] The multiphase rotating electric machine corresponds to the second motor generator 54.

The torque reducing process corresponds to the process of S66 in FIG. 4.

The deactivating process corresponds to the process of S22 in FIGS. 2, 5, 6.

The fluctuation torque applying process corresponds to the processes of S44 to S48 in FIG. 3.

The prohibiting process corresponds to proceeding to the process of S26 when a negative determination is made in any one of the processes of S20, S20a, and S20b.

[2] The determining process corresponds to the process of S62 in FIG. 4.

The prohibiting process corresponds to proceeding to the process of S26 when a negative determination is made in the process of S20 in FIG. 2.

[3] The prohibiting process corresponds to proceeding to the process of S26 when a negative determination is made in the process of S20a in FIG. 5.

[4] The prohibiting process corresponds to proceeding to the process of S26 when a negative determination is made in the process of S20b in FIG. 6.

[5] The prohibiting process corresponds to proceeding to the process of S26 when a negative determination is made in the process of S24 in FIGS. 2, 5, 6 and a negative determination is made in the process of S20, S20a, or S20b.

Modifications

The present embodiments may be modified as follows. The above-described embodiments and the following modifications can be combined as long as the combined modifications remain technically consistent with each other.

Modification Related to Condition for Executing Torque Reducing Process

The condition for executing the torque reducing process does not have to be that the above-described logical conjunction of conditions (A) and (B) in S62 is true. For example, instead of condition (A), part of the execution condition of the torque reducing process may be that the current in one of the phases of the second motor generator 54 remains greater than or equal to the threshold value ith for a predetermined time period or longer. In this case, condition (B) may be omitted. In other words, the execution condition of the torque reducing process may be that the current in one of the phases remains greater than or equal to the threshold value ith for the predetermined time period or longer.

The condition for executing the torque reducing process does not have to be related to phase current. For example, the condition for executing the torque reducing process may be that the logical conjunction of condition (B), condition (C), and condition (D) is true. Conditions (C) and (D) are as follows.

Condition (C): The temperature of the second motor generator 54 is greater than or equal to a predetermined temperature.

Condition (D): The temperature of the second inverter 58 is greater than or equal to the predetermined temperature.

Instead, for example, the execution condition of the torque reducing process may be that the logical conjunction of conditions (B) and (C) is true. Alternatively, for example, the execution condition of the torque reducing process may be that the logical conjunction of conditions (B) and (D) is true.

The condition for executing the torque reducing process may include a condition in which the vehicle is in an accelerator held state. The accelerator held state refers to a state in which the vehicle is almost at rest on an uphill due to accelerator operation. Whether the vehicle is in the accelerator held state can be determined from the accelerator operation amount ACCP and the vehicle speed SPD.

Modification Related to Prohibiting Process that Prohibits Regeneration Process

In the process of S20a in FIG. 5, when the vehicle speed SPD is less than or equal to the threshold value Sth, the regenerating process for the GPF 34 is prohibited. Instead, for example, the regenerating process may be prohibited when the logical conjunction is true of the condition in which the vehicle speed SPD is less than or equal to the threshold value Sth and a condition in which the value of a variable indicating the torque of the second motor generator 54 is greater than or equal to a predetermined value. The value of the variable indicating the torque may be related to the torque calculated from current or the like, the requested torque for the second motor generator 54, or the current that flows through the second motor generator 54. The requested torque for the second motor generator 54 may be the second requested torque Tmg2* or the second requested torque base value Tmg2b*.

In the process of S20b in FIG. 6, when the second rotation speed Nmg2 is less than or equal to the predetermined value Nth2, the regenerating process for the GPF 34 is prohibited. Instead, for example, the regenerating process may be prohibited when the logical conjunction is true of the condition in which the second rotation speed Nmg2 is less than or equal to the predetermined value Nth2 and the condition in which the value of the variable indicating the torque of the second motor generator 54 is greater than or equal to the predetermined value. The value of the variable indicating the torque may be related to the torque calculated from current or the like, the requested torque for the second motor generator 54, or the current that flows through the second motor generator 54.

Modification Related to Fluctuation Torque Applying Process

In the above-described embodiments, it is assumed during the regenerating process for the GPF 34 that the combustion energy of cylinders #2 to #4 satisfies the engine requested output Te* and the output requested for the internal combustion engine 10. Instead, for example, the throttle valve 14 may be operated so as to have an open degree that is obtained when combustion control is executed in every one of cylinders #1 to #4 in correspondence with the engine requested output Te*. In this case, the output of the internal combustion engine 10 decreases due to the deactivation of combustion control for cylinder #1. The decrease may be compensated for by adding a direct-current component to at least one of the first superimposition torque ΔTmg1* and the second superimposition torque ΔTmg2*.

In FIG. 3, the first amplitude A1 and the first phase φ1 are variably set in correspondence with the engine rotation speed NE, the engine requested output Te*, and the first rotation speed Nmg1. Instead, for example, if the engine rotation speed NE used to execute the regenerating process is limited to a narrow range, the first amplitude A1 and the first phase φ1 may be variably set in correspondence with only the engine requested output Te* and the first rotation speed Nmg1. In the case of limiting the first rotation speed Nmg1 at the moment to a narrow range, the first amplitude A1 and the first phase φ1 may be variably set in correspondence with only the engine requested output Te*.

Additionally, the first amplitude A1 and the first phase φ1 do not have to be variably set in correspondence with only some of the engine rotation speed NE, the engine requested output Te*, and the first rotation speed Nmg1. Instead, for example, the first amplitude A1 and the first phase φ1 may be variably set in correspondence with the engine requested output Pe*, the engine rotation speed NE, and the first rotation speed Nmg1.

The fluctuation component in the first superimposition torque ΔTmg1* is not limited to torque of a sine wave.

The process that limits vibration resulting from the regenerating process for the GPF 34 may include only applying the second superimposition torque ΔTmg2* without applying the first superimposition torque ΔTmg1* and.

In FIG. 3, the second amplitude A2 and the second phase φ2 are variably set in correspondence with the engine rotation speed NE, the engine requested output Te*, and the second rotation speed Nmg2. Instead, for example, if the engine rotation speed NE used to execute the regenerating process is limited to a narrow range, the second amplitude A2 and the second phase φ2 may be variably set in correspondence with only the engine requested output Te* and the second rotation speed Nmg2.

Additionally, the second amplitude A2 and the second phase φ2 do not have to be variably set in correspondence with only some of the engine rotation speed NE, the engine requested output Te*, and the second rotation speed Nmg2. Instead, for example, the second amplitude A2 and the second phase φ2 may be variably set in correspondence with the engine requested output Pe*, the engine rotation speed NE, and the second rotation speed Nmg2.

The second superimposition torque ΔTmg2* is not limited to torque of a sine wave. Instead, the second superimposition torque ΔTmg2* may be, for example, torque that has a pulse waveform only in one stroke and is zero in other strokes in a single combustion cycle.

Modification Related to Deactivating Process

The deactivating process is not limited to the regenerating process. For example, the deactivating process may be performed to deactivate the supply of fuel in the deactivated cylinder (one or more of the cylinders of the internal combustion engine) in order to adjust the output of the internal combustion engine 10. As another option, for example, when the oxygen absorption amount of the three-way catalyst 32 is less than or equal to a given value, the deactivating process may be performed to deactivate combustion control only in one or more of the cylinders in order to supply oxygen to the three-way catalyst 32 and execute control that sets the air-fuel ratio of air-fuel mixture in the remaining cylinders to the stoichiometric air-fuel ratio.

Modification Related to Estimation of Deposition Amount

The process that estimates the deposition amount DPM is not limited to the one illustrated in S12, S14 of FIG. 2. Instead, for example, the deposition amount DPM may be estimated using the intake air amount Ga and the pressure difference between the upstream side and the downstream side of the GPF 34. More specifically, the deposition amount DPM is estimated to be a larger value when the pressure difference is large than when the pressure difference is small.

Even when the pressure difference is the same, the deposition amount DPM simply needs to be estimated to be a larger value when the intake air amount Ga is small than when the intake air amount Ga is large.

Modification Related to Aftertreatment Device

Further, the GPF 34 does not have to be located on the downstream side of the three-way catalyst 32 in the exhaust passage 30. Furthermore, the aftertreatment device does not necessarily have to include the GPF 34. The GPF 34 is not limited to a filter that supports a three-way catalyst. For example, when a three-way catalyst is provided upstream of the GPF 34, the GPF 34 may only include a filter.

Modification Related to Controller

The control circuitry of the controller is not limited to a device that includes the CPU 72 and the ROM 74 and executes software processing. For example, at least part of the processes executed by the software in the above-described embodiments may be executed by hardware circuits dedicated to executing these processes (such as ASIC). That is, the controller may be modified as long as it has any one of the following configurations (a) to (c): (a) a configuration including a processor that executes all of the above-described processes according to programs and a program storage device such as a ROM (including a non-transitory computer readable memory medium) that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

Modification Related to Multiphase Rotating Electric Machine

The multiphase rotating electric machine is not limited to a three-phase rotating electric machine and may be, for example, a five-phase rotating electric machine.

The multiphase rotating electric machine of the hybrid electric vehicle is not limited to the first motor generator 52 or the second motor generator 54. In other words, the hybrid electric vehicle is not limited to a series-parallel hybrid vehicle. The hybrid electric vehicle may be, for example, a parallel hybrid vehicle.

In this specification, "at least one of A and B" should be understood to mean "only A, only B, or both A and B."

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid electric vehicle, wherein the controller comprises control circuitry configured to
transmit power of an internal combustion engine and power of a multiphase rotating electric machine to a driven wheel in the hybrid electric vehicle in which the controller is employed,
the control circuitry is configured to execute a torque reducing process, a deactivating process, a fluctuation torque applying process, and a prohibiting process,
the torque reducing process reduces torque of the multiphase rotating electric machine when a magnitude of current in a particular phase of the multiphase rotating electric machine remains greater than or equal to a given value,
the deactivating process deactivates combustion control in a deactivated cylinder that is one or more of cylinders of the internal combustion engine and continues combustion control in the remaining ones of the cylinders,
the fluctuation torque applying process cyclically fluctuates the torque of the multiphase rotating electric machine in a cycle that is an integral multiple of a compression top dead center occurrence cycle when the deactivating process is being executed, the compression top dead center occurrence cycle being a cycle during which a compression top dead center occurs in the internal combustion engine, and
the prohibiting process prohibits execution of the deactivating process in a predetermined situation in which a rotation speed of a rotary shaft of the multiphase rotating electric machine is less than or equal to a given speed.

2. The controller for the hybrid electric vehicle according to claim 1, wherein
the control circuitry is further configured to execute a determining process that determines whether an execution condition of the torque reducing process is satisfied, and
the prohibiting process includes a process that prohibits the execution of the deactivating process by determining that the predetermined situation is a case where the determining process determines that the execution condition is satisfied.

3. The controller for the hybrid electric vehicle according to claim 1, wherein the prohibiting process includes a process that prohibits the execution of the deactivating process by determining that the predetermined situation is a case where a vehicle speed is less than or equal to a threshold value.

4. The controller for the hybrid electric vehicle according to claim 1, wherein the prohibiting process includes a process that prohibits the execution of the deactivating process by determining that the predetermined situation is a case where the rotation speed of the rotary shaft of the multiphase rotating electric machine is less than or equal to a predetermined value.

5. The controller for the hybrid electric vehicle according to claim 1, wherein the prohibiting process includes a process that suspends the deactivating process when the predetermined situation occurs when the deactivating process is being executed.

6. A control method for a hybrid electric vehicle, the control method comprising:
transmitting power of an internal combustion engine and power of a multiphase rotating electric machine to a driven wheel in the hybrid electric vehicle in which the control method is employed;
reducing torque of the multiphase rotating electric machine when a magnitude of current in a particular phase of the multiphase rotating electric machine remains greater than or equal to a given value;

executing a deactivating process that deactivates combustion control in a deactivated cylinder that is one or more of cylinders of the internal combustion engine and continues combustion control in the remaining ones of the cylinders;

cyclically fluctuating the torque of the multiphase rotating electric machine in a cycle that is an integral multiple of a compression top dead center occurrence cycle when the deactivating process is being executed, the compression top dead center occurrence cycle being a cycle during which a compression top dead center occurs in the internal combustion engine; and prohibiting execution of the deactivating process in a predetermined situation in which a rotation speed of a rotary shaft of the multiphase rotating electric machine is less than or equal to a given speed.

7. A non-transitory computer-readable memory medium that stores a program for causing a processor to execute a control process for a hybrid electric vehicle, the control process comprising:

transmitting power of an internal combustion engine and power of a multiphase rotating electric machine to a driven wheel in the hybrid electric vehicle in which the control process is employed;

reducing torque of the multiphase rotating electric machine when a magnitude of current in a particular phase of the multiphase rotating electric machine remains greater than or equal to a given value;

executing a deactivating process that deactivates combustion control in a deactivated cylinder that is one or more of cylinders of the internal combustion engine and continues combustion control in the remaining ones of the cylinders;

cyclically fluctuating the torque of the multiphase rotating electric machine in a cycle that is an integral multiple of a compression top dead center occurrence cycle when the deactivating process is being executed, the compression top dead center occurrence cycle being a cycle during which a compression top dead center occurs in the internal combustion engine; and prohibiting execution of the deactivating process in a predetermined situation in which a rotation speed of a rotary shaft of the multiphase rotating electric machine is less than or equal to a given speed.

* * * * *